US006822966B2

(12) United States Patent
Putcha et al.

(10) Patent No.: US 6,822,966 B2
(45) Date of Patent: *Nov. 23, 2004

(54) ALLOCATING BUFFERS FOR DATA TRANSMISSION IN A NETWORK COMMUNICATION DEVICE

(75) Inventors: Sivarama Seshu Putcha, Lee, NH (US); Wallace Matthews, Northwood, NH (US)

(73) Assignee: Enterasys Networks, Inc., Andover, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,946

(22) Filed: Mar. 1, 1999

(65) Prior Publication Data

US 2003/0198241 A1 Oct. 23, 2003

(51) Int. Cl.[7] .............................................. H04L 12/28
(52) U.S. Cl. ..................................... 370/411; 370/413
(58) Field of Search ............................. 370/230, 230.1, 370/231, 233, 234, 235, 238.1, 253, 395.1, 395.2, 468, 465, 356, 357, 411, 413, 412, 414, 415

(56) References Cited

U.S. PATENT DOCUMENTS

| | | | |
|---|---|---|---|
| 4,845,710 A | 7/1989 | Nakamura et al. | 370/110.1 |
| 4,933,937 A | 6/1990 | Konishi | 370/85.13 |
| 5,237,661 A | 8/1993 | Kawamura et al. | 395/250 |
| 5,594,732 A | 1/1997 | Bell et al. | 370/401 |
| 5,619,495 A | 4/1997 | Yamanaka et al. | 370/413 |
| 5,636,215 A | 6/1997 | Kubo et al. | 370/397 |
| 5,768,257 A | 6/1998 | Khacherian et al. | 370/229 |
| 5,805,816 A | 9/1998 | Picazo, Jr. et al. | 395/200.53 |
| 5,838,677 A | 11/1998 | Kozaki et al. | 370/389 |
| 5,982,748 A * | 11/1999 | Yin et al. | 370/232 |
| 5,999,531 A * | 12/1999 | Ferolito | 370/390 |
| 6,044,061 A * | 3/2000 | Aybay | 370/230 |
| 6,052,368 A * | 4/2000 | Aybay | 370/357 |
| 6,072,772 A * | 6/2000 | Charny | 370/229 |
| 6,148,337 A * | 11/2000 | Estberg | 709/224 |
| 6,219,352 B1 * | 4/2001 | Bonomi | 370/417 |
| 6,292,492 B1 * | 9/2001 | Bonomi | 370/415 |
| 6,317,427 B1 * | 11/2001 | Augusta | 370/357 |
| 6,430,152 B1 * | 8/2002 | Jones et al. | 370/229 |
| 6,442,138 B1 * | 8/2002 | Yin | 370/232 |

* cited by examiner

*Primary Examiner*—Douglas Olms
*Assistant Examiner*—Ricardo M. Pizarro
(74) *Attorney, Agent, or Firm*—Lahive & Cockfield, LLP

(57) ABSTRACT

A network communication device for directing data units over a communication network includes at least one input and/or output port arranged to receive and/or transmit data units, a plurality of buffer units divided into several sub-pools, and a buffer allocator for allocating buffer units between the sub-pools. The buffer allocator is arranged to determine a priority value for each sub-pool based on quality of service for each connection established at at least one port. The buffer allocator is also arranged to determine a utilization value of the port, and arranged to allocate buffer units for each sub-pool based on the priority value and based on the utilization value. The buffer allocator creates a precedence list to ensures that a minimal number of connections, which are established at a most utilized port, will suffer data unit loss while receiving the data units.

32 Claims, 5 Drawing Sheets

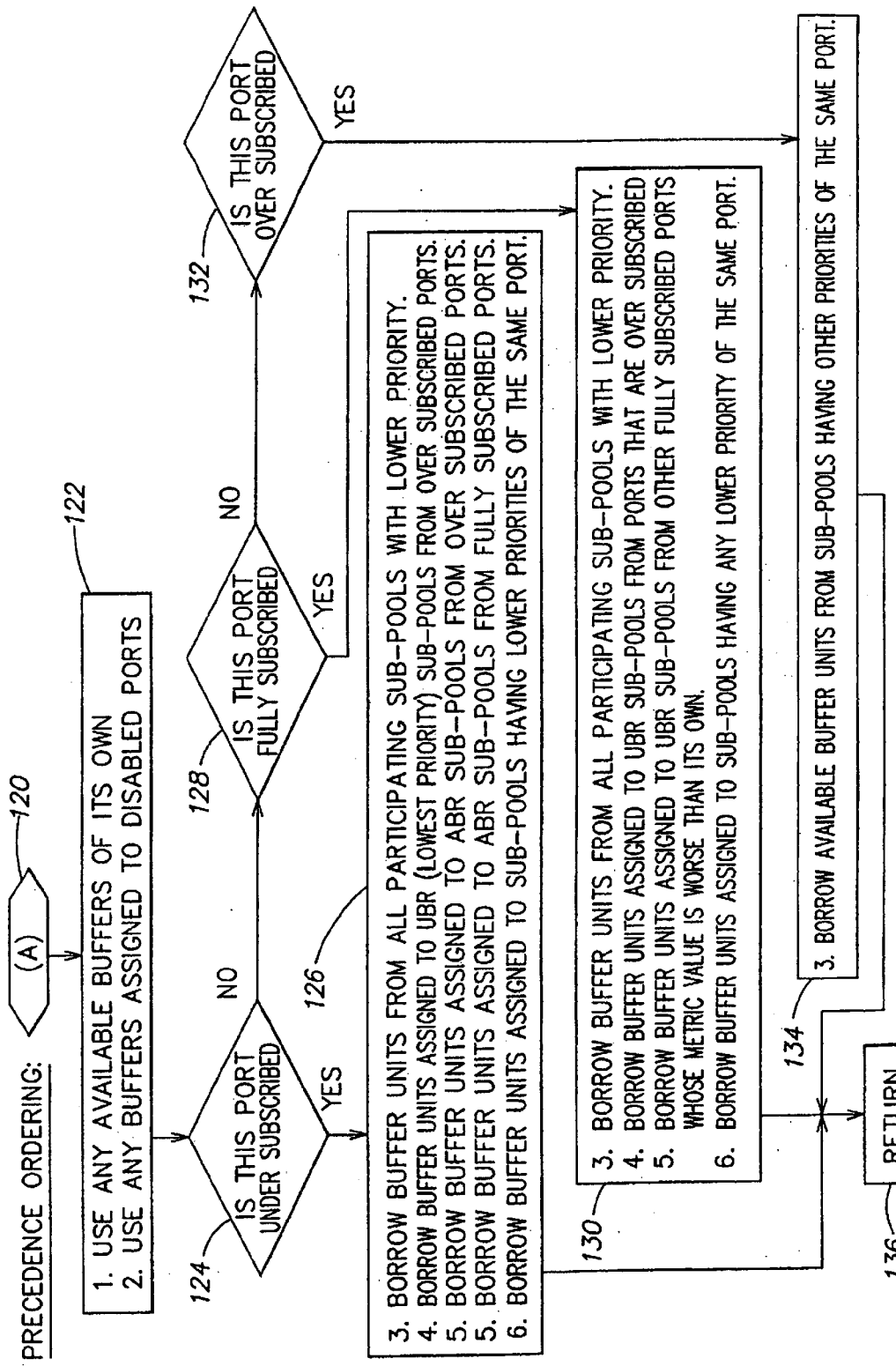

ALLOCATING BUFFERS FOR DATA TRANSMISSION IN A NETWORK COMMUNICATION DEVICE

FIELD OF INVENTION

The present invention relates to allocating buffers for data transmission in a network communication device constructed to direct network traffic. More particularly, the invention relates to allocating buffers in the network device based on port utilization and quality of service goals to achieve fair buffer usage.

BACKGROUND

Computer networks have been used by a large number of users to increase computing power, share resources and communicate. Computer networks include a number of computers or other devices located in one room or one building and connected by a local area network (LAN), such as Ethernet or Token Ring. LANs located in different locations can be interconnected by switches, routers, bridges, microwave links or satellite links to form a wide area network (WAN). Such a network may include hundreds of connected devices distributed over numerous geographical locations and belonging to different organizations.

One computer or video communication device can send data to another device using network communications devices (e.g., packet switches, routers, bridges) interconnected by transmission media or data links. Viewed from the outside, a network communications device includes input ports that receive data and output ports that send data over data links. Inside the network device, transmitted data is accepted at input ports, buffered and transferred internally, and eventually received at output ports for re-transmission over the next data link. This process uses various scheduling and arbitration algorithms for "switching" the data.

Typically, network communications devices transmit data in a standardized format, such as TCP/IP datagrams, frames, or ATM cells, which generally will be referred to as data units. Each data unit typically includes a header portion with addressing information and a body portion with transmitted data or payload. A data unit sent between network devices may, in general, vary in size depending on the type of the data unit. When a data unit arrives at an input port of a network communication device, a routing algorithm analyzes the header and makes a forwarding decision based on a destination address carried by the header.

In the process of forwarding data from an input port to an output port, different internal switching devices can use several temporary memories (called buffers). A communication device decides if an incoming data unit is buffered or dropped, based on the incoming data unit itself. This decision is performed at the line speed, and is executed after the start of the header and before the last bit of the data unit is received. This way the communication device can re-use the current buffer for the next data unit if decided that the current data unit will be dropped.

The buffers may simply be arranged into a single large pool of buffer units to be used for all received data units stored by the device. This arrangement assures that no data units will be arbitrarily dropped as long as there are available buffer units for storage. However, to this arrangement cannot effectively arbitrate access to several concurrent inputs and outputs. Alternatively, separate pools of buffers may be associated with input ports and output ports. Based on the location of buffers, there are generally three classes of data switching architectures: output buffered, input buffered, or combined input-output buffered architectures. The present invention is applicable to all three architectures.

An output buffered network device places data units, arriving at its input port, into different output buffers located at its output ports depending on the address of each data unit. An output buffered network device, having N input ports and receiving data at M bits per second, needs a data transmission rate of N×M for the switching to ensure that data units are not lost (i.e., dropped). The buffers store the received data units when the transmission rate is lower.

Advantageously, output buffered network communication devices can use up to the full bandwidth of outbound data links because of the immediate forwarding of the received data units into output buffers. The data units are fed from output buffers to the output data links as fast as the links can accept them. However, when the transmission rate is lower than the reception rate, the communication device has to keep buffering the data units and may eventually run out of buffers. For a larger communication device having many input ports with a high link speed, the buffer capacity and speed must be increased proportionally in order to handle the combined data rates of all input ports being switched to different output ports. Increasing the buffer capacity and speed increases the cost of output buffered network devices.

A network communication device can assign one pool of buffers for each output port (or input port), which is commonly called "per port queuing". In this arrangement, one port cannot interfere with another port's performance. However, higher priority traffic may suffer a higher loss of data units (e.g., ATM cell, frames) then lower priority traffic. The data loss occurs even though there may be, for example, idle ports with available cell/frame buffers; this is the result of the buffer fragmentation.

Alternatively, the communication device can assign one pool of buffers for each priority, which is called "per priority queuing". In this arrangement, higher priority traffic will not suffer data unit loss because of over-subscription of lower priority traffic. However, the buffers allocated to higher priority traffic may not be available to lower priority traffic when the higher priority traffic is idle. In another arrangement, the communication device can assign one pool of buffers for each priority for each output port (or input port). This is called "per port and priority queuing". Advantageously, a given port and priority will only drop data units due to the action of data streams using that port and priority. However, this arrangement fragments buffer queues and thus buffers may be used inefficiently. For example, buffer units may be assigned to ports and priorities that are currently idle, and thus buffer units are left unused. Therefore, efficient buffer allocation becomes very important.

A network communication device can also use an input buffered architecture. Popular input buffered devices use non-blocking input buffered switching called the crossbar. The input buffered crossbar has a crossbar fabric running at a speedup of 1 (i.e., equal to link rate). However, if each input port maintains a single FIFO queue, data suffer from head-of-line blocking. This blocking limits the maximum achievable throughput and is relatively inflexible. To eliminate head-of-line blocking, input ports can have virtual output queues (VOQs). Inputs ports with VOQs have a bank of queues with one queue per output port. Data units are stored in random access buffers at the input ports, and pointers to the data are stored in the respective VOQs. Buffer allocation becomes again important.

Asynchronous transfer mode (ATM) switching technology enables fast data switching for wide ranges of traffic demands. ATM can carry virtually any type of information that can be expressed in a digital form, ranging from voice telephone traffic, to real-time video, to high-speed file transfers, etc. ATM based networks may eliminate the need for different networks to carry different types of traffic. ATM transfer is asynchronous in the sense that the recurrence of ATM cells, which carry transferred information, is not necessarily periodic. Each communication device that uses the ATM network submits an ATM cell for transfer when it has a cell to send. Once aggregated and scheduled, the ATM cells ride in synchronous slots on a high-speed media, such as a SONET optical fiber.

ATM organizes digital data into cells having a fixed length and format. Each ATM cell includes a header, primarily for identifying cells relating to the same virtual connection, and the transmitted data or payload. The ATM standard defines a cell size that is 53 bytes or octets. The first five bytes of each ATM cell form the header, and the remaining 48 bytes represent payload data. The header of each ATM cell includes a field for a virtual path identifier (VPI) and a virtual circuit identifier (VCI). The VPI and VCI together identify the particular circuit or a communication path to which each cell relates.

Within a transport stream, the VPI and VCI identifiers direct the stream into separate logical or 'virtual' paths and segregate traffic within each virtual path into logical or 'virtual' circuits. Within one or more virtual path connections, an ATM communication device makes the virtual circuit connections available to transport any number of individual communications. Such logical circuit connections are set up (i.e., opened) and closed, as needed, to efficiently provide a required transport capacity for independent communication sessions for a number of separate communication devices.

A network communication device can treat all data units equally, that is, all data units can have the same priority when traveling over a network. Alternatively, different data units can have various levels of the quality of service (QoS). This concept has been applied to ATM networks (and to other network formats to some extent). The measures of QoS include a cell loss rate, a cell transfer delay, bandwidth, and other. The cell loss rate reflects the number of cells that are lost, for example, when more cells arrive at a switch than can be accommodated in the switch's buffer. The cell transfer delay reflects the amount of time a cell spends at a switch (or other storage and/or transfer device) before being re-transmitted. For example, if a cell sits in a buffer for a long period of time while other (e.g., higher QoS level) cells are transmitted, the cell transfer delay of this cell is the amount of time it spends in the buffer. Other measures of QoS may include a cell delay variation (i.e., the amount of variation in cell delay) or a maximum cell transfer delay (rather than an average cell transfer delay).

Furthermore, different types of information require different transport rates of data. For example, real-time video transmission requires a high constant bit rate or a high variable bit rate to maintain synchronism, but packet data communications, in general, do not require a constant or variable bit rate. Similarly, voice communication (which usually produces bursty data traffic) requires real-time transmission, but can tolerate some cell loss without having a detrimental impact. On the other hand, a loss of a small number of cells in file transfer, such as e-mail, requires re-transmission of the entire file. Therefore, a network communication device also needs to optimally assign buffers associated with individual connections to take into account the different types of information. Furthermore, a network communication device needs to decide whether a new connection can be opened, and the device needs to allocate (re-assign) optimally buffers when such a connection is opened.

Therefore, there is a need for a network communication device and method that can efficiently allocate buffers for data transmission.

SUMMARY

The present invention is a novel network communication device for directing network traffic and a novel method for allocating buffer units in a network communication device. The novel device or method allocate buffer units based on port utilization and quality of service goals to achieve fair buffer usage.

In one aspect, a network communication device for directing data units over a communication network includes at least one input and/or output port arranged to receive and transmit data units, a plurality of buffer units divided into several sub-pools, and a buffer allocator for allocating buffer units between the sub-pools. The buffer allocator is arranged to determine a priority value for each sub-pool based on quality of service parameter for each connection established at at least one input port. The buffer allocator is also arranged to determine a utilization value of the input port, and arranged to allocate buffer units for each sub-pool based on the priority value and based on the utilization value, wherein a minimal number of connections established at a most utilized port will suffer loss of data units while receiving the data units.

In another aspect, a computer-readable medium includes a representation of an algorithm used in a network communication device constructed for directing data units over a communication network. The network communication device includes a plurality of buffer units divided into sub-pools, and at least one input and/or output port connected to the communication network and arranged to receive and transmit data units. The algorithm for allocating buffer units between the sub-pools includes the steps of:

determining a priority value for each sub-pool based on a quality of service parameter for each connection established at at least one input port;

determining a utilization value of the input port; and allocating buffer units for each sub-pool based on the priority value and based on the utilization value, wherein a minimal number of connections established at a most utilized port will suffer loss of data units while receiving the data units.

Another aspect is a method for dynamically managing buffer units assigned to sub-pools of a network communication. The network communication includes at least one input and/or output port connected to a communication network and arranged to receive and transmit data units. The network communication device also includes a plurality of buffer units divided into several sub-pools for buffering the data units. The method includes specifying a priority value for each sub-pool based on at least one quality of service parameter for transmitting the data units from the at least one port; determining a utilization value of at least one input port; and allocating buffer units for each of the sub-pools based on the priority value and based on the utilization value, wherein a minimal number of the data units will be lost during reception or transmission of the data units at a most utilized port of the network communication device.

Preferred embodiments of the above aspects include one or more of the following features:

The buffer allocator is arranged to determine the priority value of the sub-pool based on all connections having the same quality of service parameter and being established at the port. The buffer allocator is further arranged to assign the allocated buffer units to each of the sub-pools for use by the connections.

The network communication device is further arranged to establish a new connection using the buffer units assigned to one of the sub-pools. The quality of service parameter relates to a type of bit rate handled by the connection.

The utilization value is calculated as a port line speed minus an aggregate peak cell rate for an under-subscribed port having the port line speed larger than the aggregate peak cell rate. The utilization value is calculated as an aggregate steady state cell rate minus a port line speed for a fully-subscribed port having an aggregate steady state cell rate smaller than its port line speed and its port line speed smaller than the aggregate peak cell rate. The utilization value is calculated as an inverse of (an aggregate steady state cell rate minus a port line speed) for a fully-subscribed port having the aggregate steady state cell rate larger than its port line speed.

The network communication device may be a circuit switch, a bridge, or a router using a connection oriented protocol, or may be another similar device arranged to direct data units transferred from an origination device to a destination device over a communication network.

The network communication device is further arranged to establish a new connection after the buffer allocator determines the quality of service parameter for the new connection, determines the number of the buffer units required for the new connection, and borrows the number of the buffer units from other sub-pools using a precedence order of the sub-pools. The borrowing of the number of the buffer units from other sub-pools includes establishing a precedence order of the sub-pools.

The precedence order includes:

Initially:
1. Borrow the available buffer units of its own pool, i.e., buffer assigned to a sub-pool but not allocated to an existing connection.
2. Borrow all available assigned buffer units from disabled ports.

For Each Under-subscribed (US) Port Borrow Buffer Units from Sub-pools in the Following Order:
1. Borrow buffer units available from all sub-pools with lower priority of all participating ports.
2. Borrow buffer units assigned to unspecified bit rate (UBR) sub-pools from over-subscribed (OS) ports.
3. Borrow buffer units assigned to UBR sub-pools from fully-subscribed (FS) ports.
4. Borrow buffer units assigned to UBR sub-pools from US ports with a lower metric value.
5. Borrow buffer units assigned to available bit rate (ABR) ports.
6. Borrow buffer units assigned to sub-pools having lower priorities from the same port.

For Each FS Port, Borrow Buffer Units From Sub-pools in the Following Order:
1. Borrow buffer units available from all-sub-pools with lower priority of all participating ports.
2. Borrow buffer units assigned to UBR sub-pools of OS ports.
3. Borrow buffer units assigned to UBR sub-pools of other FS ports with a lower metric value.
4. Borrow buffer units assigned to sub-pools of any lower priority of the same port.

For Each OS Port, Borrow Buffer Units From Sub-pools in the Following Order:
1. Borrow buffer units available from sub-pools from other priorities of the same port.

BRIEF DESCRIPTION OF THE DRAWINGS

FIGS. 4 and 4A are high level flow diagrams of an adaptive buffer management algorithm.

DESCRIPTION OF PREFERRED EMBODIMENTS

Figure 1:
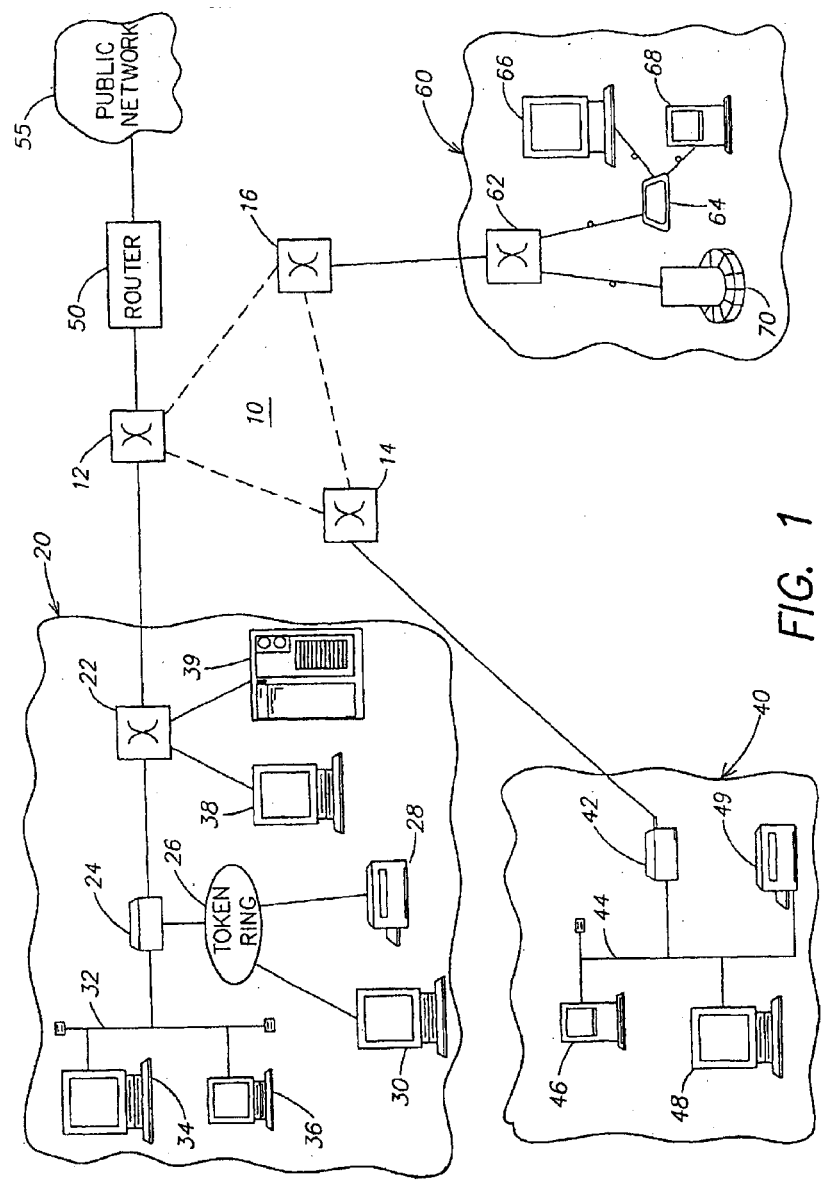
FIG. 1 shows diagrammatically a computer network.

FIG. 1 shows a communication network that includes an ATM network 10, private networks 20, 40, 60, and a public network 55. ATM network 10 includes network switches 12, 14, and 16. ATM switch 12 connects ATM network 10 to private network 20, which includes a Token Ring network 26 and an Ethernet network 32. Network 20 includes a switch 22 connected to a bridge 24, a general purpose computer 38 and a storage device 39. Bridge 24 connects Token Ring network 26 and Ethernet network 32 to switch 22. Both Token Ring network 26 and Ethernet network 32 are connected to general purpose computers (for example, computers 30, 34, and 36), printers 28 and other devices. ATM switch 14 connects ATM network 10 to a private network 40 by a bridge 42. Bridge 42 connects switch 14 to an Ethernet network 44 connected, in turn, to computers 46 and 48 and a printer 49. ATM switch 12 also connects ATM network 10 to public network 55 via a router 50. ATM switch 16 connects ATM network 10 to a private network 60 by a switch 62. Switch 62 connects a main frame computer 70 and a fiber-distributed data interface 64 (connected, in turn, to computers 66 and 68) to the communication network.

Figure 2:
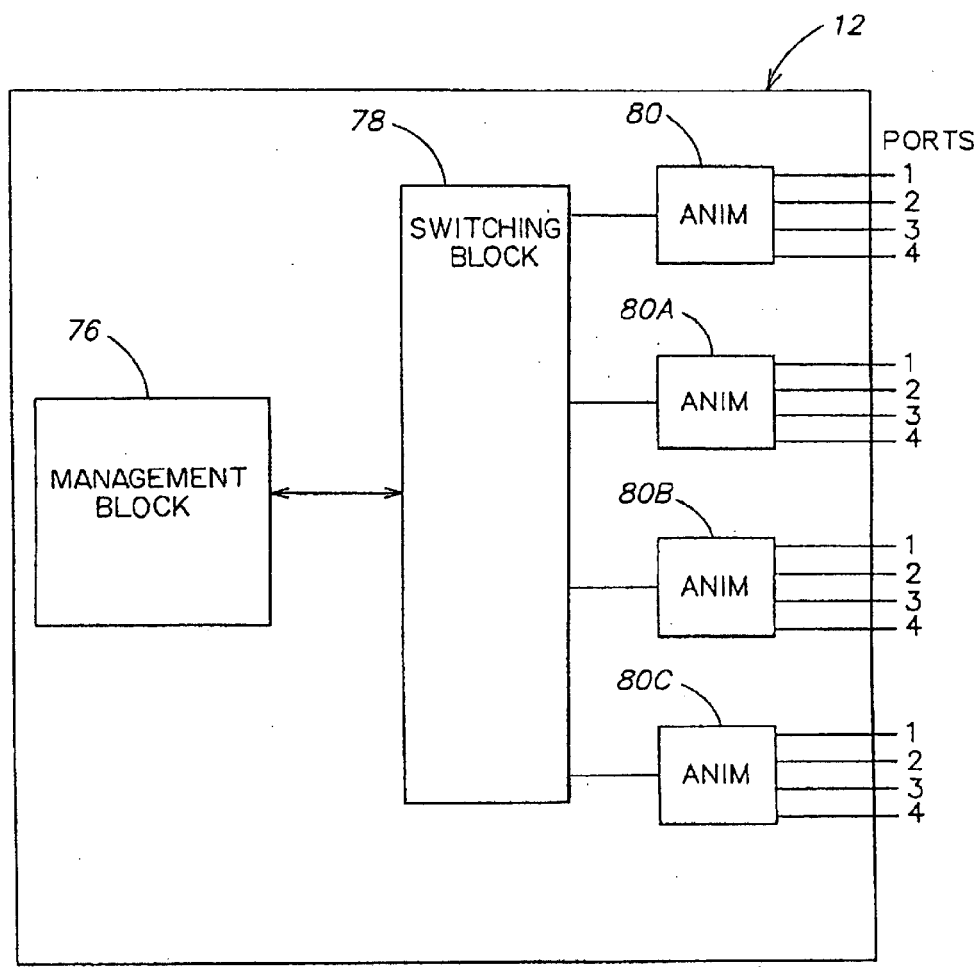
FIG. 2 shows diagrammatically a network switch used in the computer network of FIG. 1.

The present invention can be used in any network communication device using any format, but will be explained in connection with an ATM switch. FIG. 2 shows diagrammatically ATM switch 12 (or any of the switches shown in FIG. 1), which can be a Cabletron product # 9A686 with 4 network interface modules (ANIMs) 80, 80A, 80B and 80C and 4 ports per ANIM. ATM switch 12 includes a management block 76, a switching block 78, and two or four ANIMs. Depending on its configuration, each ANIM can include one, two, three or four ports that function as input or output ports. Specifically, the 9A686 switch may include two OC48 ANIM, each having 1 port communicating at the line speed of 2.4 Gbps. Alternatively, the 9A686 switch may include four OC12 ANIMs each having 2 port communicating at the line speed of 622 Mbps. In another arrangement, the 9A686 switch may include four OC3 ANIMs with three or four ports each communicating at the line speed of 155 Mbps. The present invention can operate in any of these arrangements.

Figure 3:
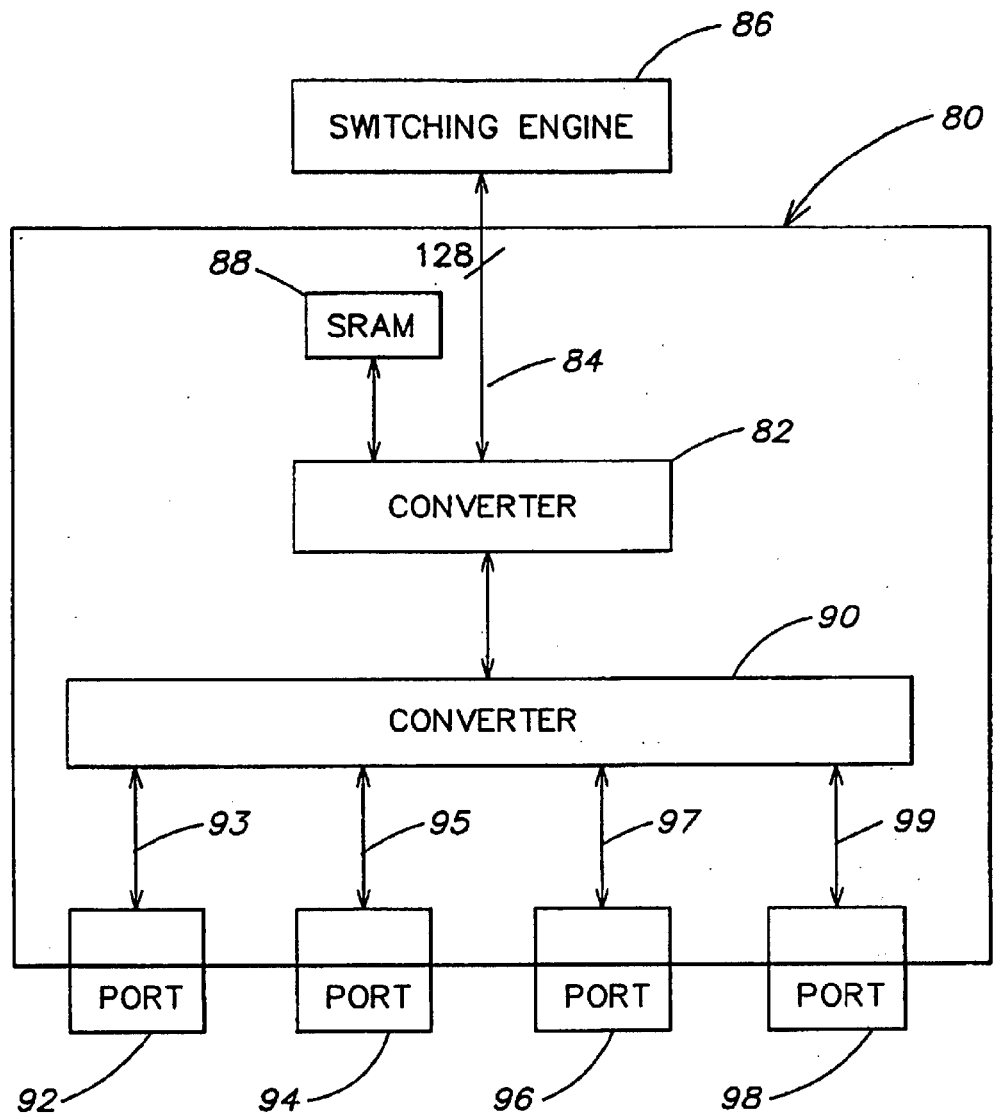
FIG. 3 shows a block diagram of a network interface module (ANIM).

Referring to FIG. 3, in a currently preferred embodiment, ANIM 80 includes a converter 82 connected via a TDM bus 84 to a switching engine 86, an SRAM memory 88, a converter 90, and input and outputs ports 92, 94, 96 and 98.

Input and outputs 92, 94, 96 and 98 are arranged to transmit data or receive data and provide them to converter 90. Converter 90 is a SONET to UTOPIA converter that converts SONET level signals, received over connections 93, 95, 97 and 99, to UTOPIA level signals. Converter 90 provides UTOPIA level signal to a converter 82. Converter 82 is a queuing and scheduling ASIC interface constructed for communication with switching engine 86. SRAM 88 stores data in 16 K buffer units (buffer cells), each buffer unit having 424 bits. SRAM 88 includes 16 buffer sub-pools, wherein four sub-pools are associated with two input and /or output ports, for example, SRAM 88 may be divided into 8 buffer sub-pools with four sub-pools per port.

ATM switch 12 is preferably an output buffered device, but in general it may be an input buffered device or a combined input-output buffered device. Based on the incoming ATM cell itself, ATM switch 12 decides if the cell is buffered or dropped. This decision is performed at the line speed. The decision occurs sometime after the start of the header and before the last bit of the data unit is received to allow re-use of the current buffer for the next ATM cell. To perform this process at the line speed, the simplest way is to forward each admitted ATM cell to an output buffer.

ANIM 80 may receive ATM cells over any one of ports 92, 94, 96 and 98 and transmit the cells out of any of ports 92, 94, 96 and 98. The selection of the input port and the output port depends on the ultimate destination of the ATM cell, the required bandwidth, and the type of information carried by the cell. The buffers permit ANIM 80 to schedule the transmission and reconcile varying rates of receiving and transmitting ATM cells. For example, if ANIM 80 receives a number of cells on ports 92, 94 and 96 and all of them are routed for transmission over the same output port 98, output port 98 may not be able to transmit them as quickly as they are received. Accordingly, these ATM cells (or data units, in general) are buffered in SRAM 88.

The ATM switch includes a buffer allocator using an algorithm described below and in Appendices A and B. The algorithm is executed on the Intel 1960 processor that resides in management block 76 (FIG. 2). In general, the buffer allocator allocates available buffer units among the individual sub-pools according to the quality of service and fairness criteria. The fairness criteria ensure that a minimal number of data sets, having the lowest priority and using the most over-utilized port, will suffer data unit loss. We apply this concept to ATM.

The specification for ATM transport defines several traffic or service categories supported by the ATM layer of a network. The types of service include a constant bit rate (CBR) service, a variable bit rate (VBR) service, an available bit rate service (ABR), and an unidentified bit rate service (UBR). For each port, we assign one sub-pool for one type of service (i.e., priority).

The CBR service provides a constant, guaranteed bandwidth over an assigned virtual connection. Thus, the buffer allocator needs to allocate a sufficient amount of buffer units for each CBR connection. The VBR service guarantees some maximum number of transmit opportunities that may be used to transmit cells over an existing virtual connection, for example, for bursty traffic. Over time, the actual rate or bandwidth may vary from almost zero (i.e., little or no use of the opportunities to send) up to a maximum number, called a peak cell rate (PCR), that is allocated for the connection. After satisfying the CBR demand, the buffer allocator allocates dynamically buffer units for each VBR connection.

For the ABR service, the specification for ATM defines an allowed cell rate (ACR), a peak cell rate (PCR) and a minimum cell rate (MCR). The allowed cell rate is the bandwidth, in terms of ATM cells per second, currently usable by a particular ABR connection. Typically, the ACR for an ABR connection varies over time, for example, as a function of the traffic load on the ATM link. The data communication device may have an opportunity to transmit data units in time slots that are available because they are not used by the CBR or VBR services. The minimum cell rate (MCR) is the lowest bandwidth that the ABR connection is always guaranteed. The MCR may be zero, in which case the device regulating traffic need not reserve any bandwidth for the ABR connection. Notably, the scheduling device only needs to make a "best effort" to provide a bandwidth, for use by the ABR connection. The device can, if necessary, allocate all transmit opportunities to higher priority traffic, in which case the ACR for the ABR circuit falls to zero.

However, if an ABR connection has an MCR value greater than zero, then the scheduling device effectively must reserve some minimum number of cell transmit opportunities, for that connection, to support traffic for that connection at no less than the MCR rate. The buffer allocator dynamically allocates buffer units so that each ANIM can dynamically schedule traffic and guarantee non-zero minimum cell rates for its ABR connections.

The buffer allocator uses the following three parameters that are available when a connection is established: (a) the type of service (also called priority); (b) a packing constant; and (c) a buffer sizing parameter. For ATM, the type of service parameter includes CBR, VBR, ABR or UBR, which were defined above. (For IP, the type of service parameter may include a connectionless or connection oriented service.) The packing constant parameter enables a proprietary management control to fine tune the bandwidth and buffer allocations. This parameter equals to one, where no management control is performed. The buffer sizing parameter defines the number of buffer units needed by each connection. (For IP, this parameter may be based on a packet size or other connection header data).

For each ATM connection, a traffic descriptor carries a "setup" message with one or more connection parameters. For each CBR connection, the traffic descriptor provides PCR, for each VBR connection it provides PCR, a steady state cell rate (SCR), and a maximum burst rate (MBS). For each ABR connection, the traffic descriptor provides PCR and MCR, and for each UBR connection it provides PCR. For each port, the aggregate PCR is calculated by adding all provided PCRs for the individual connections. The aggregate SCR is a number calculated by adding all PCRs for all CBR connections, all SCRs for all VBR connection, and all MCRs for all ABR connections. However, when using a conservative approach, the algorithm can replace MCR by MCR+(PCR-MCR)/2, for all ABR connections, and can use PCR/2 for all UBR connections.

The algorithm provided in Appendices A and B sets the buffer sizing parameter as follows: For each CBR connection, the buffer sizing parameter is set to two buffer units, and for each VBR connection it is set to the maximum burst size (MBS). For each ABR connection, the buffer sizing parameter is set to the transient buffer exposure (TBE), which is a value that can be negotiated with each end user. Each end user can request the number of buffers to be provided. However, due to the limited number of available buffer units, for a US port, the maximum number of buffer units will be set to 32; for an FS port, the maximum number will be 16; and, for an OS port, the maximum number will be 8 buffer units. For each UBR connection, the buffer sizing parameter is set to 32 buffer units. However, to prevent data loss, the buffer allocator can allocate buffer units to a selected UBR connection.

Importantly, the buffer allocator also assigns to each port one of the following three zones that describes port utilization: under-subscribed (US), fully-subscribed (FS), and over-subscribed (OS). The particular zone is assigned based upon the aggregate peak cell rate (aggregate PCR) for all connections using that port, and the aggregate steady state cell rate (aggregate SCR) for all connections using the port. When the aggregate PCR is less than the ports line speed, the port is under-subscribed. When the aggregate PCR is greater than the ports line speed and the aggregate SCR is less than the ports line speed, the port is fully-subscribed. When the aggregate SCR is greater than the ports line speed, the port is over-subscribed.

The buffer allocator gives a higher buffer retention priority to an under-subscribed (US) port than a fully-subscribed (FS) port. If needed, an over-subscribed (OS) port will loose buffer units first since such port is already loosing data units and the additional buffer loss (due to buffer allocation) would only marginally reduce the port performance. That is, the resulting data loss will be accepted as unavoidable for OS ports. On the other hand, for US ports, ANIM 80 does not drop data units even if the connection has a small number of buffers allocated since the US port do not exhaust their buffer allotment faster than they are be filled due to their low line speeds. To minimize the number of connections suffering data loss, FS ports are allocated any residual buffers, beyond its minimum allotment.

Furthermore, the buffer allocator assigns for each port a metric for comparing the ports within the same zone (i.e. subscription status). For a US port, the metric values equals to the port line speed minus the aggregate PCR. For an FS port, the metric value equals to the line speed minus the aggregate SCR. For and OS port, the metric value equals to 1/(aggrgate SCR-the line speed). Among ports with an equal subscription status, the port with a higher metric value will get a higher priority for buffer allocation. The aggregate PCR also specifies the bandwith, which is the inverse of a minimum inter-arrival time of data units.

The buffer allocator assembles buffer unit requirements for all connections that require buffer units, including candidate connections. If the buffer requirement value is less than the number of available buffer units in all buffer sub-pools, the candidate connections are admitted and the buffer allocator re-assigns the size of the individual buffer sub-pools based on the requirements of the admitted connection. This adjustment usually reduces the size of several buffer sub-pools and increase the size of at least one buffer sub-pool. The buffer allocator uses precedence ordering, provided below, to achieve the fairness criteria. The fairness criteria control a data unit loss suffered by a minimal number of connections with the lowest priority of the most over-utilized port.

The buffer allocator establishes a precedence list that reflects the type of service (i.e., the priority), an operational status, and a metric value. When a sub-pool needs additional buffers to establish a connection, the buffer allocator "borrows" buffer units from other sub-pools with lower precedence ordering, as explained in connection with FIGS. 4 and 4A. The new connection is established if all available buffer units can maintain the existing connections according to the provided rules.

Figure 4:
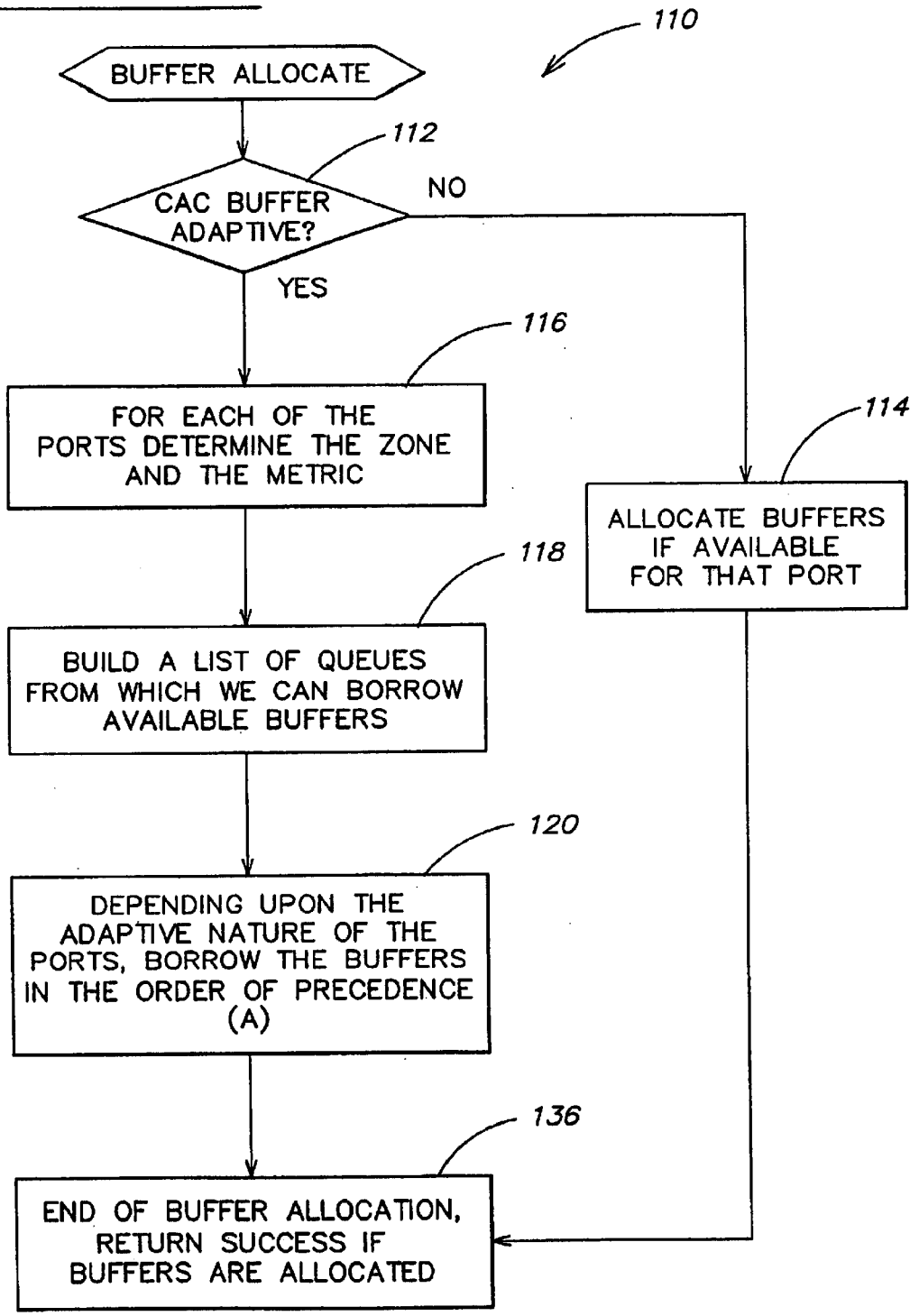

Referring to FIG. 4, initially a startup algorithm creates four buffer sub-pools assigned for each port; that is, one sub-pool for each type of service (i.e., priority). The buffer allocator can statically allocate the buffer units for each sub-pool or can allocate buffer units by performing a buffer allocation algorithm 110. Buffer allocation algorithm 110 may be performed when opening a new connection or, in general, at any time during the operation when there is an unexpectedly high cell loss. In a currently preferred embodiment, for each port, the CBR sub-pool has 512 buffer units assigned, the VBR sub-pool has 512 buffer units assigned, the ABR sub-pool has 1024 buffer units assigned, and the UBR sub-pool has 2048 buffer units assigned.

Prior to allocating buffers, connection admission control (CAC) decides if a new connection can be accepted based on the attributes of both the requested connection and the one or more existing connections (step 112). If adaptive buffering is not desired, for example, when starting up the device, buffers are allocated manually (114). When adaptive buffering is performed, in step 116, for each port, the buffer allocator determines the zone (i.e., the port utilization) and the metric value. As described above, the zone and the metric value for each port are calculated based on the port line speed, the aggregate PCR, and the aggregate SCR for all connections using that port.

In step 118, the buffer allocator scans over the ports and the connections to build a glean list of buffer sub-pools in the precedence based on which it can borrow available buffers. As described above, CBR sub-pools get a higher precedence than the VBR sub-pools, which get a higher precedence than the ABR sub-pools and UBR sub-pools. The buffer allocator orders the ports by their zone putting the OS ports at the bottom, then the US ports and the FS at the top. Within each zone, the buffer allocator orders the ports based on their metric value by putting the port with the lowest metric value at the lowest position on the list. Based on the glean list, buffer allocator allocates buffer units in the order of precedence (steps 120 through 136). The order of precedence is based in the type of service (i.e., priority) as follows:

Initially:
1. Borrow the available buffer units of its own pool, i.e., buffer assigned to a sub-pool but not allocated to an existing connection.
2. Borrow all available assigned buffer units from disabled ports.

For Each US Port, Borrow Buffer Units From Sub-pools in the Following Order:
1. Borrow buffer units available from all sub-pools with lower priority of all participating ports.
2. Borrow buffer units assigned to UBR sub-pools from OS ports.
3. Borrow buffer units assigned to UBR sub-pools from FS ports.
4. Borrow buffer units assigned to UBR sub-pools from US ports with a lower metric value.
5. Borrow buffer units assigned to ABR sub-pools from OS ports.
6. Borrow buffer units assigned to sub-pools having lower priorities from the same port.

For Each FS Port, Borrow Buffer Units From Sub-pools in the Following Order:
1. Borrow buffer units available from all sub-pools with lower priority of all participating ports.
2. Borrow buffer units assigned to UBR sub-pools of OS ports.
3. Borrow buffer units assigned to UBR sub-pools of other FS ports with a lower metric value.

4. Borrow buffer units assigned to sub-pools of any lower priority of the same port.

For Each OS Port, Borrow Buffer Units From Sub-pools in the Following Order:

1. Borrow buffer units available from sub-pools from other priorities of the same port.

FIG. 4A shows a flow diagram using the above procedure. In step 122, the buffer allocator borrows available buffer units (i.e., assigned but not allocated) and then borrows buffer units from disabled ports. If additional buffer units are needed, the buffer allocator scans each port and identifies US ports (step 124), FS ports (step 128), and OS ports (step 132). First, to provide buffers for FS or US ports, the buffer allocator borrows from any sub-pool of that has a lower priority (i.e. type of service). To provide buffers for an OS port, the buffer allocator borrows from sub-pools of the same OS port that have other priorities (step 134). At any stage, when the buffer demand is satisfied (i.e., the number of borrowed buffer units equals the number of buffer units needed to establish a new connection), the buffer allocator returns to step 136.

In steps 126 and 130, if additional buffer units are needed, the buffer allocator borrows buffer units assigned to UBR sub-pools from OS ports starting with an OS port having the lowest metric value. Additionally, the buffer allocator can borrow buffer cells assigned to UBR connections of FS ports, starting with an FS port having a lowest metric value, and provide them to another FS port. Next, if an US port needs buffers, the buffer allocator borrows buffer cells assigned to ABR sub-pools from OS ports. If an US port needs further buffers, the buffer allocator borrows buffer cells-assigned to ABR sub-pools from FS ports, starting with an FS port having a lower metric value. Finally, a sub-pool from an FS port can borrow buffer units from any sub-pool of an FS port with a lower metric value, and any sub-pool from an US port can borrow buffer units from any sub-pool of an US port with a lower metric value. That is, the algorithm follows the order of precedence provided above. As the buffer allocator borrows assigned buffer units from any sub-pool in the order of precedence, the remaining buffer units may be smaller than the number of buffer units allocated to existing connections in that sub-pool. After re-assignment of buffer units to a newly admitted connection, the existing connections, of the sub-pool with insufficient buffer units, will loose data units. However, the order of precedence ensures that only connections having the lowest priority (i.e., type of service) and using the most over-utilized port, will suffer data unit loss.

EXAMPLE 1

The following is an example of buffer assignment and buffer allocation for a single port when establishing a new VBR connection that requires six buffer units. Referring to Table I-1, initially, port n has 96 buffer units assigned to the CBR sub-pool, 96 buffer units assigned to the VBR sub-pool, 128 buffer units assigned to the ABR sub-pool, and 256 buffer units assigned to the UBR sub-pool. Table I-2 shows the allocated buffer units (i.e., buffer units used by the existing connections) out of the assigned buffer units, shown in Table I-1. Specifically, all CBR connections use 16 buffer units from the CBR sub-pool, all VBR connections use 12 buffer units, all ABR connections use 100 buffer units, and all UBR connections use 136 buffer units. Prior to admitting the new VBR connection at port n, the VBR sub-pool has 96 assigned buffer units, but uses for all its connections only 12 buffer units, thereby having 84 buffer units available. Thus, in step 122, buffer allocator allocates six buffer units to the new connection out of the 84 available buffer units in the VBR sub-pool. As shown in Tables I-3, no new assignment is required when establishing the VBR connection. Table I-4 shows that the VBR sub-pool now has 18 allocated buffer units.

Prior to Admitting a New Connection After Admitting a New Connection

TABLE I-1

| Assignment: Port n | |
|---|---|
| Type of Service | Buffers |
| CBR | 96 |
| VBR | 96 |
| ABR | 128 |
| UBR | 256 |

TABLE I-2

| Allocation: Port n | |
|---|---|
| Type of Service | Buffers |
| CBR | 16 |
| VBR | 12 |
| ABR | 100 |
| UBR | 136 |

TABLE I-3

| Assignment: Port n | |
|---|---|
| Type of Service | Buffers |
| CBR | 96 |
| VBR | 96 |
| ABR | 128 |
| UBR | 256 |

TABLE I-4

| Allocation: Port n | |
|---|---|
| Type of Service | Buffers |
| CBR | 16 |
| VBR | 18 |
| ABR | 100 |
| UBR | 136 |

EXAMPLE 2

The following is an example of buffer assignment and buffer allocation when establishing at port 1 a new CBR connection requiring 44 buffer units. Tables II-1 through II-8 show existing buffer assignments and allocations for the individual sub-pools of ports 0, 1, 2 and 3. As shown in Tables II-1, the CBR sub-pool has assigned 96 buffer units, the VBR sub-pool has assigned 96 buffer units, the ABR sub-pool has assigned 128 buffer units, and the UBR sub-pool has assigned 120 buffer units. Referring to Tables II-2, out of the assigned buffer units, 92 buffer units are allocated to existing CBR connections, 92 buffer units are allocated to existing VBR connections, 124 buffer units are allocated to existing ABR connections, and 114 buffer units are allocated to existing UBR connections.

Prior to Admitting a New CBR Connection:

Assignment:

TABLE II-1

Port 0

| Type of Service | Buffers |
|---|---|
| CBR | 96 |
| VBR | 96 |
| ABR | 128 |
| UBR | 120 |

TABLE II-3

Port 1

| Type of Service | Buffers |
|---|---|
| CBR | 96 |
| VBR | 96 |
| ABR | 112 |
| UBR | 136 |

TABLE II-5

Port 2

| Type of Service | Buffers |
|---|---|
| CBR | 92 |
| VBR | 100 |
| ABR | 148 |
| UBR | 100 |

TABLE II-7

Port 3

| Type of Service | Buffers |
|---|---|
| CBR | 4 |
| VBR | 0 |
| ABR | 0 |
| UBR | 0 |

Allocation:

TABLE II-2

Port 0

| Type of Service | Buffers |
|---|---|
| CBR | 92 |
| VBR | 92 |
| ABR | 124 |
| UBR | 114 |

TABLE II-4

Port 1

| Type of Service | Buffers |
|---|---|
| CBR | 94 |
| VBR | 96 |
| ABR | 112 |
| UBR | 136 |

TABLE II-6

Port 2

| Type of Service | Buffers |
|---|---|
| CBR | 86 |
| VBR | 94 |
| ABR | 142 |
| UBR | 96 |

TABLE II-8

Port 3

| Type of Service | Buffers |
|---|---|
| CBR | 0 |
| VBR | 0 |
| ABR | 0 |
| UBR | 0 |

Prior to admitting the new CBR connection to port one the buffer allocator creates a glean list shown as Table III.

Glean List:

TABLE III

| Port | Priority | Amount | Total buffers |
|---|---|---|---|
| 1 | CBR | 2 | 2 |
| 3 | CBR | 4 | 6 |
| 1 | UBR | 0 | 6 |
| 0 | UBR | 6 | 12 |
| 2 | UBR | 4 | 16 |
| 1 | ABR | 0 | 16 |
| 0 | ABR | 4 | 20 |
| 2 | ABR | 6 | 26 |
| 1 | VBR | 0 | 26 |
| 0 | VBR | 4 | 30 |
| 2 | VBR | 6 | 36 |
| 1 | CBR | 0 | 36 |
| 0 | CBR | 4 | 40 |
| 2 | CBR | 4 | 44 |

In step 116, buffer allocator determined that, for example, all ports 0, 1, and 2 are all under-subscribed (US) ports having the following metric order [Port 1, Port 0, Port 2]. In step 122, the buffer allocator borrows two available buffers in the CBR sub-pool of port 1 (since the CBR sub-pool has 96 assigned buffers, but only 94 buffers allocated to existing CBR connections). Next, in step 122, buffer allocator borrows four buffer units from port 3, which is disabled. Thus, the total available buffer units is now 6 (as shown in Table III). Since all ports are under subscribed, from step 124 buffer allocator proceeds to step 126. First, buffer allocator will borrow from sub-pools of all sub-pools with lower priority (type of service) assigned to all participating ports. According to the metric order, first buffer allocator will examine the UBR sub-pool of port 1 and determine that all assigned 136 buffer units were allocated to existing UBR connections leaving no available buffer units to borrow. Thus, the total available buffer units remain 6 at this point. Next, according to the metric order, buffer allocator goes to the UBR sub-pool of port (Table II-1). Here, out of the 120 assigned buffer units, 114 were allocated leaving six buffer units to borrow. Thus, the total number of available buffer has increased to 12 (Table III). Next, the buffer allocator examines the ABR sub-pools of all three ports according to the metric order. The ABR sub-pool of port 1 has 112 buffer units assigned and 112 buffer units allocated leaving no available buffer units. The ABR sub-pool of port 0 has 128 buffer units assigned but only 124 buffer units allocated leaving four available buffer units to borrow . . . . After examining the VBR sub-pool of port 2, which has 6 available buffers, the total amount of available buffers is 36. Next, buffer allocator looks at the CBR sub-pools of all ports according to their metric values. In the CBR sub-pool of port 1, all buffer units are allocated to existing CBR connections. (Note: The two available buffer units were entered into the glean list initially) In the CBR sub-pool of port 0, four buffer units are available. In the CBR sub-pool of port 2, 92 buffer units are assigned but only 86 buffer units are allocated to existing CBR connections. Thus, six buffer units are available to borrow. However, the new CBR connection requires only four more buffer units to reach the required number of 44 buffer units to admit the connection.

After Admitting a New CBR Connection Having 44 Buffers Allocated:

Assignment:

TABLE IV-1

Port 0

| Type of Service | Buffers |
| --- | --- |
| CBR | 96 |
| VBR | 92 |
| ABR | 124 |
| UBR | 114 |

TABLE IV-3

Port 1

| Type of Service | Buffers |
| --- | --- |
| CBR | 138 |
| VBR | 96 |
| ABR | 112 |
| UBR | 136 |

TABLE IV-5

Port 2

| Type of Service | Buffers |
| --- | --- |
| CBR | 88 |
| VBR | 94 |
| ABR | 142 |
| UBR | 96 |

TABLE IV-7

Port 3 (Disabled)

| Type of Service | Buffers |
| --- | --- |
| CBR | 0 |
| VBR | 0 |
| ABR | 0 |
| UBR | 0 |

Allocation:

TABLE IV-2

Port 0

| Type of Service | Buffers |
| --- | --- |
| CBR | 92 |
| VBR | 92 |
| ABR | 124 |
| UBR | 114 |

TABLE IV-4

Port 1

| Type of Service | Buffers |
| --- | --- |
| CBR | 138 |
| VBR | 96 |
| ABR | 112 |
| UBR | 136 |

TABLE IV-6

Port 2

| Type of Service | Buffers |
| --- | --- |
| CBR | 86 |
| VBR | 94 |
| ABR | 142 |
| UBR | 96 |

TABLE IV-8

Port 3 (Disabled)

| Type of Service | Buffers |
| --- | --- |
| CBR | 0 |
| VBR | 0 |
| ABR | 0 |
| UBR | 0 |

Tables IV-1 through IV-8 show the new assignments and allocations of the buffer units. After admitting the new connections, 138 buffer units are assigned to the CBR sub-pool of port 1 and all 138 buffer units are allocated to the existing CBR connections.

The buffer allocator may also execute another allocation algorithm that is an obvious modification of allocation algorithm 110. Such modified algorithm is also within the true scope of the inventions described above. Additional embodiments are within the following claims:

What is claimed is:

1. A method for dynamically managing buffer units assigned to sub-pools of a network communication device comprising:
providing a network communication device including at least one port connected to a communication network and arranged to receive and transmit data units, said network communication device including a plurality of buffer units divided into several sub-pools for buffering said data units;
specifying a priority value for each of said sub-pools based on at least one quality of service parameter for transmitting said data units from said at least one port, wherein said priority value of each of said sub-pools is determined based on all connections having the same quality of service parameter and being established at said at least one port;
determining a utilization value of said at least one port;
allocating buffer units for each of said sub-pools based on said priority value and based on said utilization value; and
assigning said allocated buffer units to each of said sub-pools for use by said connections,
wherein a minimal number of said data units is lost during reception or transmission of said data units at a most utilized port of said network communication device.

2. The method of claim 1 further comprising establishing a new connection using said buffer units assigned to one of said sub-pools.

3. The method of claim 2 wherein said establishing said new connection includes:
determining said quality of service parameter for said new connection;
determining the number of said buffer units required for said new connection; and
borrowing said number of said buffer units from other sub-pools.

4. The method of claim 3 wherein said borrowing said number of said buffer units from other sub-pools includes establishing a precedence order of said sub-pools.

5. The method of claim 4 wherein said establishing said precedence order includes:
(a) initially:
a1. borrow the buffer units of its own pool that have been assigned to a sub-pool but not allocated to an existing connection;
a2. borrow all available assigned buffer units from disabled ports;
(b) for each port that is under-subscribed, borrow buffer units from sub-pools in the following order:
b1. borrow buffer units available from all sub-pools with lower priority of all participating ports;
b2. borrow buffer units assigned to UBR sub-pools from ports that are over subscribed;
b3. borrow buffer units assigned to UBR sub-pools from ports that are fully subscribed ports;
b4. borrow buffer units assigned to UBR sub-pools from ports that are under subscribed and have a lower metric value;
b5. borrow buffer units assigned to ABR sub-pools from ports that are over subscribed;
b6. borrow buffer units assigned to sub-pools having lower priorities from the same port;
(c) for each FS port, borrow buffer units from sub-pools in the following order:

c1. borrow buffer units available from all sub-pools with lower priority of all participating ports;
c2. borrow buffer units assigned to UBR sub-pools of OS ports;
c3. borrow buffer units assigned to UBR sub-pools of other FS ports with a lower metric value;
c4. borrow buffer units assigned to sub-pools of any lower priority of the same port; and
(d) for each OS port, borrow buffer units available from sub-pools from other priorities of the same port.

6. A network communication device for directing data units over a communication network, including:
at least one port connected to the communication network and arranged to receive and transmit data units;
a plurality of buffer units divided into several sub-pools; and
a buffer allocator for allocating buffer units between said sub-pools, said buffer allocator being arranged to determine a priority value for each of said sub-pools based on a quality of service parameter for each connection established at said at least one port; said buffer allocator being arranged to determine a utilization value of said at least one port, and said buffer allocator being also arranged to allocate buffer units for each sub-pool based on said priority value and based on said utilization value, wherein a minimal number of connections established at a most utilized port will suffer loss of data units while receiving said data units,
wherein said buffer allocator is arranged to determine said priority value of each of said sub-pools on all connections having the same quality of service parameter and being established at said at least one port, and,
wherein said buffer allocator is further arranged to assign said allocated buffer units to each of said sub-pools for use by said connections.

7. The network communication device of claim 6 further arranged to establish a new connection using said buffer units assigned to one of said sub-pools.

8. The network communication device of claim 7 further arranged to establish a new connection after said buffer allocator determines said quality of service parameter for said new connection, determines the number of said buffer units required for said new connection, and borrows said number of said buffer units from other sub-pools using a precedence order of said sub-pools.

9. A method of dynamically managing buffer units of a network communication device, the network communication device including a plurality of ports connected to a communication network to receive and transmit data units, and including a plurality of sub-pools of buffer units for buffering the data units, each sub-pool corresponding to one of the plurality of ports and having a priority value based on a quality of service parameter for transmitting data units, the method comprising steps of:
for at least a first port of the plurality of ports, determining a utilization status indicative of a utilization of the first port for at least one of: transmitting data units and receiving data units; and
allocating one or more buffer units from the plurality of sub-pools to a first of the plurality of sub-pools based on at least the priority values of the plurality of sub-pools and the utilization status of the at least first port.

10. The method of claim 9, wherein the first sub-pool corresponds to the first port.

11. The method of claim 9, wherein the first port transmits data units for one or more connections, and the first sub-pool corresponds to at least a first connection of the one or more connections, and wherein the step of allocating comprises:

allocating the one or more data units for use by the first connection.

12. The method of claim 11, wherein the step of allocating further comprises:

allocating at least a first of the one or more data units to the first sub-pool from a second sub-pool corresponding to a second port distinct from the first port.

13. The method of claim 11, wherein the step of allocating comprises:

allocating, to the first connection, buffer units of the first sub-pool not already allocated to any of the one or more connections of the first port.

14. The method of claim 11, wherein the plurality of ports includes one or more disabled ports, and further comprises:

allocating, to the first sub-pool, buffer units of one or more sub-pools corresponding to the one or more disabled ports.

15. The method of claim 9, wherein each of the plurality of sub-pools buffers data units for one or more connections of the port, corresponding to the sub-pool, and, for each sub-pool, the priority value of the sub-pool corresponds to a type of bit rate handled by the one or more connections.

16. The method of claim 15, wherein the priority value of each sub-port corresponds to one of the following types of service: a constant bit rate service, a variable bit rate service, an available bit rate service, and an unidentified bit rate service.

17. The method of claim 15, wherein, for each of one or more of the ports, the step of determining comprises:

determining that a port line speed of the port is larger than the aggregate peak cell rate of the port, wherein the utilization status is based on such determination.

18. The method of claim 17, wherein, for each of the one or more ports that has the port line speed higher than the aggregate peak cell rate, the step of determining further comprises:

calculating a utilization metric as the port line speed minus the aggregate peak cell rate, wherein the step of allocating is based at least in part on one or more of the calculated utilization matrices.

19. The method of claim 9, wherein, for one or more of the ports, the step of determining comprises:

determining that an aggregate steady state cell rate of the port is smaller than a port line speed of the port and the port line speed is smaller than an aggregate peak cell rate of the port, wherein the utilization status is based on such determination.

20. The method of claim 9, wherein, for one or more of the ports, the step of determining comprises:

determining that an aggregate steady state cell rate of the port is larger than a port line speed of the port, wherein the utilization status is based on such determination.

21. The method of claim 9, further comprising:

establishing a precedence order of one or more of the plurality of sub-pools, the precedence order being based on the priority values of the one or more sub-pools and based on the utilization statuses of the plurality of ports, wherein the step of allocating comprises allocating according to the precedence order.

22. The method of claim 21, wherein:

a plurality of sub-pools buffer data units for one or more connections of the first port;

the step of determining comprises determining that an aggregate steady state cell rate of the first port is larger than a port line speed of the first port; and wherein the step of allocating further comprises allocating one or more buffer units from one or more of the plurality of sub-pools that correspond to the first port and have a lower priority value than the priority value of the first sub-pool.

23. A network communication device for transmitting and receiving data units over a communication network, the network device comprising:

a plurality of ports connected to a communication network to receive and transmit data units;

a plurality of sub-pools of buffer units for buffering the data units, each sub-pool corresponding to one of the plurality of ports and having a priority value based on a quality of service parameter for transmitting data units; and a buffer allocator to determine, for at least a first port of the plurality of ports, a utilization status indicative of a utilization of the first port for at least one of: transmitting data units and receiving data units, and to allocate one or more of the buffer units from the plurality of sub-pools to a first of the plurality of sub-pools based on at least the priority values of the plurality of sub-pools and the utilization status of the at least first port.

24. The network device of claim 23, wherein the first sub-pool corresponds to the first port.

25. The network device of claim 23, wherein the first port transmits data units for one or more connections, and the first sub-pool corresponds to at least a first connection of the one or more connections, and wherein the buffer allocator is further operative to allocate the one or more data units for use by the first connection.

26. The network device of claim 23, wherein each of the plurality of sub-pools buffers data units for one or more connections of the port corresponding to the sub-pool, and, for each sub-pool, the quality of service parameter corresponds to a type of bit rate handled by the one or more connections.

27. The network device of claim 26, wherein the priority value of each sub-port corresponds to one of the following types of service: a constant bit rate service, a variable bit rate service, an available bit rate service, and an unidentified bit rate service.

28. The network device of claim 23, wherein the buffer allocator is further operative to determine, for each of one or more of the ports, that a port line speed of the port is larger than the aggregate peak cell rate of the port, wherein the utilization status is based on such determination.

29. The network device of claim 23, wherein the buffer allocator is further operative to determine, for each of one or more of the ports, that an aggregate steady state cell rate of the port is smaller than a port line speed of the port and the port line speed is smaller than an aggregate peak cell rate of the port, wherein the utilization status is based on such determination.

30. The network device of claim 23, wherein the buffer allocator is further operative to determine, for one or more of the ports, that an aggregate steady state cell rate of the port is larger than a port line speed of the port, wherein the utilization status is based on such determination.

31. The network device of claim 23, where the buffer allocator is further operative to establish a precedence order of one or more of the plurality of sub-pools, the precedence order being based on the priority values of the one or more sub-pools and based on the utilization statuses of the one or more ports, and to allocate one or more of the buffer units of the one or more sub-pools to a first of the plurality of sub-pools according to the precedence order.

32. A system for dynamically managing buffer units of a network communication device, the network communication device including a plurality of ports connected to a communication network to receive and transmit data units, and including a plurality of sub-pools of buffer units for buffering the data units, each sub-pool corresponding to one of the plurality of ports having a priority value based on at least one quality of service parameter for transmitting data units, the system comprising:

means for determining, for each of the one or more of the plurality of ports, a utilization status indicative of a utilization of the port as part of at least one of: transmitting data units and receiving data units; and means for allocating one or more of the buffer units of the one or more sub-pools to a first of the plurality of sub-pools based on at least the priority values of the plurality of sub-pools and the utilization status of the at least first port.

* * * * *